(12) United States Patent
Peterson et al.

(10) Patent No.: US 12,134,562 B2
(45) Date of Patent: Nov. 5, 2024

(54) HOMOGENEOUSLY MIXED SOLIDS AND METHODS OF MAKING THE SAME

(71) Applicants: Georgia Tech Research Corporation, Atlanta, GA (US); South Dakota School of Mines, Rapid City, SD (US)

(72) Inventors: G. P. "Bud" Peterson, Atlanta, GA (US); Haiping Hong, Rapid City, SD (US)

(73) Assignees: Georgia Tech Research Corporation, Atlanta, GA (US); South Dakota School of Mines, Rapid City, SD (US)

( * ) Notice: Subject to any disclaimer, the term of this patent is extended or adjusted under 35 U.S.C. 154(b) by 892 days.

(21) Appl. No.: 17/054,202

(22) PCT Filed: May 10, 2019

(86) PCT No.: PCT/US2019/031707
§ 371 (c)(1),
(2) Date: Nov. 10, 2020

(87) PCT Pub. No.: WO2020/068170
PCT Pub. Date: Apr. 2, 2020

(65) Prior Publication Data
US 2021/0213523 A1 Jul. 15, 2021

Related U.S. Application Data

(60) Provisional application No. 62/669,793, filed on May 10, 2018.

(51) Int. Cl.
*C01B 32/174* (2017.01)
*B22F 1/0545* (2022.01)
(Continued)

(52) U.S. Cl.
CPC .......... *C01B 32/174* (2017.08); *B22F 1/0545* (2022.01); *B22F 1/107* (2022.01);
(Continued)

(58) Field of Classification Search
CPC ...... C01B 32/174; B22F 1/0545; B22F 1/107; B22F 1/18; B82Y 30/00
See application file for complete search history.

(56) References Cited

U.S. PATENT DOCUMENTS

2014/0205829 A1 7/2014 Misra et al.
2015/0311504 A1* 10/2015 Hong .................... H01M 4/131
429/231.95

(Continued)

OTHER PUBLICATIONS

Iskandar ("Nanoparticle processing for optical applications—A review." Advanced Powder Technology 20.4 (2009): 283-292.) (Year: 2009).*

(Continued)

*Primary Examiner* — Ricardo D Morales
(74) *Attorney, Agent, or Firm* — Troutman Pepper Hamilton Sanders LLP; Ryan A. Schneider; Dustin B. Weeks (57) ABSTRACT

Disclosed herein is a method of homogeneously mixing solids, comprising: mixing, in a fluid medium, at least a first nanoparticle material and a surfactant, wherein the surfactant causes the first nanoparticle material to distribute uniformly in the fluid medium and have a specific charge; adding, to the fluid medium, a second nanoparticle material, wherein the surfactant has a charge of opposite polarity to the zeta potential of the second nanoparticle material; attaching the second nanoparticle material to the first nanoparticle material using the charge attraction of the surfactant and the second nanoparticle material to obtain a homogeneous material; and removing the attached first and second nanoparticle
(Continued)

materials from the fluid medium to obtain a solid homogeneous material.

10 Claims, 7 Drawing Sheets

(51) Int. Cl.
*B22F 1/107* (2022.01)
*B33Y 40/10* (2020.01)
*B33Y 70/10* (2020.01)
*B82Y 30/00* (2011.01)
*B82Y 40/00* (2011.01)

(52) U.S. Cl.
CPC ..... *B22F 2301/058* (2013.01); *B22F 2301/10* (2013.01); *B22F 2301/255* (2013.01); *B22F 2302/40* (2013.01); *B22F 2998/10* (2013.01); *B22F 2999/00* (2013.01); *B33Y 40/10* (2020.01); *B33Y 70/10* (2020.01); *B82Y 30/00* (2013.01); *B82Y 40/00* (2013.01); *C01B 2202/08* (2013.01)

(56) References Cited

U.S. PATENT DOCUMENTS

2017/0222212 A1 8/2017 Hong et al.
2017/0327701 A1* 11/2017 Connor ............... B33Y 10/00
2019/0214640 A1 7/2019 Salem

OTHER PUBLICATIONS

International Search Report and Written Opinion issued in PCT Application No. PCT/US2019/031707 dated Mar. 3, 2020.
Yamada, et al.l, "Synthesis of Carbon Nanotube/Silver Nanocomposites by Ultrasonication," Materials Transactions, vol. 51, Issue 10 (Sep. 8, 2010) pp. 1769-1772.
Kim, et al., "Functionalized Multiwall Carbon Nanotube/Gold Nanoparticle Composites," Langmuir, vol. 20, Issue 19, (Aug. 18, 2004) p. 8242.
Wang, et al., "Thionine-Interlinked Multi-Walled Carbon Nanotube/ gold Nanoparticle Composites," Carbon vol. 43, No. 10 (Jun. 2, 2007) pp. 2111-2115.

* cited by examiner

HOMOGENEOUSLY MIXED SOLIDS AND METHODS OF MAKING THE SAME

CROSS-REFERENCE TO RELATED APPLICATIONS

This application claims the benefit of U.S. Provisional Patent Application No. 62/669,793, filed 10 May 2018, the entire contents and substance of which is incorporated herein by reference in its entirety as if fully set forth below.

STATEMENT OF RIGHTS UNDER FEDERALLY SPONSORED RESEARCH

This invention was made with government support under Award No. NNX09AU83A awarded by the National Aeronautics and Space Administration (NASA) EPSCoR, and under Cooperative Agreement W911NF-15-2-0034-S awarded by the United States Army Research Laboratories. The government has certain rights in the invention.

FIELD OF THE DISCLOSURE

The present disclosure relates generally to solid materials and methods of making the same. Particularly, embodiments of the present disclosure relate to homogeneously mixed solids.

BACKGROUND

Molecular nanomaterials, including nanotubes (CNT), carbon nanofibers (CNF), nano metal oxide, and nano metal particles, have the potential to demonstrate novel properties such as increased electrical, thermal, mechanical, and magnetic properties. Mixing nanomaterials in the solid phase has always present a difficulty in the use of such materials and has greatly limited functional nanomaterials to be solution processable or remain in a solution. Even still, solid aggregation, phase separation, and general non-homogeneity remain a problem in the combination of functional materials at the nano-scale. A technology able to homogeneously mix two unique, functional, and solid-phase nanomaterials would greatly expand the design space of such industries as composites, energy, solar cells, green packaging, conductive materials, Internet of Things devices, magnetic devices, batteries, electrodes, sensors, thermal fluids, microelectronics, solid-state lighting, consumer electronics, in vivo electronics, aviation, aeronautics, corrosion resistance, power production, additive manufacturing, reinforced polymers, plastics, lubricants, and the like. Such a technology may lead to advanced applications and implementation in the use of molecular nanomaterial for many applications, in both defense and domestic.

What is needed, therefore, is a method to homogeneously mix solid-phase materials at the nanoscale that can be cast into any variety of applications. Embodiments of the present disclosure address this need as well as other needs that will become apparent upon reading the description below in conjunction with the drawings.

BRIEF SUMMARY OF THE INVENTION

The present invention relates to solid materials and methods of making the same. An exemplary embodiment of the present invention can provide a method of homogeneously mixing solids, comprising: mixing, in a fluid medium, at least a first nanoparticle material and a surfactant, wherein the surfactant has a first charge and causes the first nanoparticle material to distribute uniformly in the fluid medium; adding, to the fluid medium, a second nanoparticle material, wherein the surfactant first charge is of opposite polarity to the zeta potential of the second nanoparticle material; attaching the second nanoparticle material to the first nanoparticle material using the charge attraction of the surfactant and the second nanoparticle material to obtain a homogeneous material; and removing the attached first and second nanoparticle materials from the fluid medium to obtain a solid homogeneous material.

In any of the embodiments disclosed herein, the method can further comprise removing the surfactant from the attached first and second nanoparticle materials.

In any of the embodiments disclosed herein, the method can further comprise dissolving the solid homogeneous material into a functional solution.

In any of the embodiments disclosed herein, the method can further comprise casting the functional solution into a film.

In any of the embodiments disclosed herein, the method can further comprise casting, using additive manufacturing, the functional solution into a 3-dimensional structure.

In any of the embodiments disclosed herein, the method can further comprise spinning the functional solution into a fiber.

In any of the embodiments disclosed herein, the method can further comprise printing the functional solution onto a substrate.

In any of the embodiments disclosed herein, the method can further comprise forming a buffer solution in the fluid medium.

In any of the embodiments disclosed herein, the mixing can comprise ultrasonication.

In any of the embodiments disclosed herein, the first nanoparticle material can comprise a carbon-based nanoparticle.

In any of the embodiments disclosed herein, the first nanoparticle material can comprise a non-carbon-based nanoparticle.

In any of the embodiments disclosed herein, the second nanoparticle material can comprise a metal-containing nanoparticle.

In any of the embodiments disclosed herein, the metal-containing nanoparticle can be selected from the group consisting of: elemental metals, metal oxides, metalloids, metal alloys, metal sulfides, metal seleniums, and a combination thereof.

In any of the embodiments disclosed herein, the second nanoparticle can comprise a plurality of atoms arranged in a 2-dimensional lattice.

In any of the embodiments disclosed herein, the plurality of atoms arranged in a 2-dimensional lattice can be selected from the group consisting of: graphene, silicene, phosphorene, borophene, germanene, stanene, fullerene, Buckminster fullerene, boron nitride, and a combination thereof.

Another embodiment of the present disclosure can provide a solid material, comprising: a solid homogenous solution, comprising at least: a first nanoparticle material, and a second nanoparticle material; wherein the second nanoparticle material is homogeneously distributed within the first nanoparticle material.

In any of the embodiments disclosed herein, the solid homogeneous solution can further comprise a surfactant.

In any of the embodiments disclosed herein, the surfactant can comprise a first charge of opposite polarity to the zeta potential of the second nanoparticle material.

In any of the embodiments disclosed herein, the surfactant can be present in the material in an amount of 0.01% or greater by weight, based on total weight of the material.

In any of the embodiments disclosed herein, the surfactant can be present in the material in an amount of 30% or less by weight, based on total weight of the material.

In any of the embodiments disclosed herein, the surfactant can be present in the material in an amount of from 0.01% to 30% by weight, based on total weight of the material.

In any of the embodiments disclosed herein, the first nanoparticle can comprise a carbon-based nanoparticle.

In any of the embodiments disclosed herein, the second nanoparticle can comprise a metal-containing nanoparticle.

In any of the embodiments disclosed herein, the metal-containing nanoparticle can be selected from the group consisting of: elemental metals, metal oxides, metalloids, metal alloys, metal sulfides, metal seleniums, and a combination thereof.

In any of the embodiments disclosed herein, the second nanoparticle can comprise a plurality of atoms arranged in a 2-dimensional lattice.

In any of the embodiments disclosed herein, the plurality of atoms arranged in a 2-dimensional lattice can be selected from the group consisting of: graphene, silicene, phosphorene, borophene, germanene, stanene, fullerene, Buckminster fullerene, boron nitride, and a combination thereof.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

As described above, a problem with current solid mixtures and solutions is the ability to uniformly distribute solids within other solids. Mainly, it is desired to have functional solids distributed within other functional solids to create a multi-functional material. Using conventional solution-based techniques, solid aggregation, phase separation, and general non-homogeneity remain a problem in the combination of functional materials at the nanoscale. A technology able to homogeneously mix two unique, functional, and solid-phase nanomaterials would greatly expand the design space of such industries as composites, energy, solar cells, green packaging, conductive materials, Internet of Things devices, magnetic devices, batteries, electrodes, sensors, thermal fluids, microelectronics, solid-state lighting, consumer electronics, in vivo electronics, aviation, aeronautics, corrosion resistance, power production, additive manufacturing, reinforced polymers, plastics, lubricants, and the like. Molecular nanomaterials, such as carbon nanotubes (CNT), carbon nanofibers (CNF), nano metal oxides, nanocellulose, and nano metal particles, have the potential to demonstrate novel properties such as increased electrical, thermal, mechanical, and magnetic properties. This will lead to advanced applications and implementation in the use of molecular nanomaterial for many applications, in both defense and domestic.

While not wishing to be bound by any particular scientific theory, it is believed that there is a charge attraction between the nonpolar region of the surfactant molecules and certain nanoparticles. This interaction can form a shell around the certain nanoparticles with the charged head region of the surfactant molecule oriented towards the outside, with the nonpolar region orient towards the nanoparticles. In a solution, this interaction can facilitate the dispersion of the nanoparticles in the fluid thus preventing precipitation from the fluid or aggregation. In addition, charged particles can be added to the solution. The similarly charged particles will repel each other but be attracted to the charged head region of the surfactant molecule. This can create an attachment of the charged particles and the nanoparticles, while maintaining the solids uniformly distributed in solution and preventing phase aggregation.

As used herein, the term "nanoparticle" refers to a particle having at least one dimension that is no greater than 500 nm, and sometimes no greater than 100 nm, and includes, for example, "nanospheres," "nanorods," "nanocups," "nanowires," "nanoclusters," "nanolayers," "nanotubes," "nanocrystals," "nanobeads," "nanobelts," and "nanodisks."

As used herein, the term "nanoscale" refers to a dimension that is no greater than 500 nm, and sometimes no greater than 100 nm. The terms "nanoscale particle" and "nanoparticle" are used interchangeably herein.

As used herein, the term "surfactant" refers to a molecule having surface activity, including wetting agents, dispersants, emulsifiers, detergents, and foaming agents, etc.

Disclosed herein is a method of making a solid material. Particularly, embodiments of the present disclosure can provide methods for making homogeneously mixed solid materials. In some embodiments, the method can comprise a nanoparticle material (e.g., one or more, two or more, three or more, four or more, five or more, six or more, or seven or more) dispersed in a fluid medium. For example, the nanoparticle material can comprise a carbon-based material. It is understood that the first nanoparticle can comprise a non-carbon-based material, or a carbon-based material containing a non-carbon-based material. Suitable examples of a non-carbon-based material can include, but are not limited to, silicon, titanium, vanadium, chromium, manganese, iron, cobalt, nickel, copper, yttrium, zirconium, molybdenum, tantalum, gold, thorium, dysprosium, holmium, erbium, thulium, ytterbium, lutetium, palladium, tin, tungsten, or a combination thereof. Such molecules can include alloys of these elements, such as alloys of cobalt with sulfur, bromine, lead, platinum, yttrium, copper, boron, and magnesium, and compounds such as the carbides (i.e. TiC, MoC, etc.). Suitable examples of carbon-based materials for use in the present invention can include, but are not limited to, diamond nanoparticles, graphite nanoparticles, fullerenes, or carbon fibers. Furthermore, the carbon nanoparticles may be a combination of two or more selected from diamond nanoparticles, graphite nanoparticles, fullerenes, carbon fibers, and carbon nanotubes. A combination may be a mixture of two or more nanoparticles of the same type or of different types. For examples, a combination of two nanoparticles can be a mixture of single-walled nanotubes (SWNT) and multi-walled nanotubes (MWNT), a mixture of two SWNTs with different properties, a mixture of two MWNTs with different properties, a mixture of carbon nanotubes with graphite nanoparticles, a mixture of carbon nanotubes with diamond particles, and a mixture of carbon nanotubes with fullerenes.

In some embodiments, the nanoparticle material can comprise a metal-based material, such as elemental metals, metal oxides, metalloids, metal alloys, metal sulfides, metal seleniums, or a combination thereof. For example, the nanoparticle material can comprise a metal oxide. A metal oxide nanoparticle is a nanoscale particle that comprises one or more metal oxides. Such metal oxides include, for example, those formed from metal and/or metalloid, either in elemental form and/or in compounds. Suitable metal/metalloid oxides include but are not limited to $Al_2O_3$, $CuO$, $MgO$, $SiO_2$, $GeO_2$, $B_2O_3$, $TeO_2$, $V_2O_5$, $BiO_2$, $Sb_2O_5$, $TiO_2$, $ZnO$, $FeO$, $Fe_2O_3$, $Fe_3O_4$, and $CrO_3$. As used herein, the chemical formula for a metal oxide nanoparticle refers to the chemical with that formula that is a component, usually the principal component, of the nanoparticle material. The chemical may be a major or minor component of the nanoparticle. As such, the nanoparticle may not have the same chemical composition as the chemical formula. Furthermore, unless specified, the chemical formula of a nanoparticle represents any of the possible crystalline forms. For example, the chemical formula $Al_2O_3$ may represent alpha-, beta-, or gamma-aluminum oxide, or combinations thereof.

In some embodiments, the disclosed nanoparticle material can comprise one or more polymers. Suitable examples of a polymer can include, but are not limited to, biopolymers, inorganic polymers, organic polymers, conductive polymers, copolymers, fluoropolymers, polyterpenes, phenolic resins, polyanhydrides, polyketones, polyesters, polyimides (such as Matrimid 5218 or 6FDA-DAM), polyolefins, rubbers, silicones, silicone rubbers, superabsorbent polymers, synthetic rubbers, vinyl polymers, or a combination thereof. Other suitable examples of the polymer can include, but are not limited to, polyester resin, polyurethanes, polyurea, vulcanized rubber, bakelite, duroplast, urea formaldehyde, melamine resin, diallyl phthalate, epoxy resin, benzoxazines, polyimides, bismaleimides, cyanate esters, furan resins, silicone resins, thiolyte, vinyl ester, acrylic, polymethyl methacrylate, acrylonitrile butadiene styrene, chlorinated polyvinyl chloride, nylon, polylactic acid, polybenzimidazole, polycarbonate, polyether sulfone, polyoxymethylene, polyether ether ketone, polyethylene, polyphenylene sulfide, polypropylene, polystyrene, polyvinyl chloride, polyvinylidene fluoride, polytetrafluoroethylene, polyisoprene, polybutadiene, chloroprene, butyl rubber, halogenated butyl rubber, styrene butadiene, nitrile rubber, halogenated nitrile rubber, ethylene propylene rubber, ethylene propylene diene rubber, epichlorohydrin rubber, polyacrylic rubber, silicone rubber, fluorosilicone, fluoroelastomers, perfluoroelastomers, polyether block amides, chlorosulfonated polyethylene, ethylene vinyl acetate, thermoplastic elastomers, polysulfide rubber, cellulose acetate (CA), polymer of intrinsic micro porosity 1 (PIM-1), poly [3-(potassium-4-butanoate) thiophene] (PPBT), carboxymethyl cellulose (CMC), polyethylene glycol (PEG), or a combination thereof. Additional examples of suitable polymers useable include substituted or unsubstituted polymers and may be selected from polysulfones; poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; polyetherimides; polyetherketones; polyethersulfones; poly(arylene oxides) such as poly(phenylene oxide) and poly(xylene oxide); poly(esteramide-diisocyanate); polyurethanes; polyesters (including polyarylates), such as polyethylene terephthalate, poly(alkyl methacrylates), poly(acrylates), poly(phenylene terephthalate), etc.; polypyrrolones; polysulfides; polymers from monomers having alpha-olefinic unsaturation other than mentioned above such as poly (ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; poly oxadiazoles; polytriazoles; poly (benzimidazole); polycarbodiimides; polyphosphazines; etc., and interpolymers and the like.

In some embodiments, the nanoparticle material can comprise a lattice or network of atoms in the nanoscale. For example, the nanoparticle material can comprise graphene, silicene, phosphorene, borophene, germanene, stanene, fullerene, heterofullerenes, Buckminster fullerene, boron nitrate, and a combination thereof. The lattice or network of atoms in the nanoscale can exist in 2-dimensions (such as graphene sheets) or 3-dimensions (such as Bucky balls).

Figure 2A:
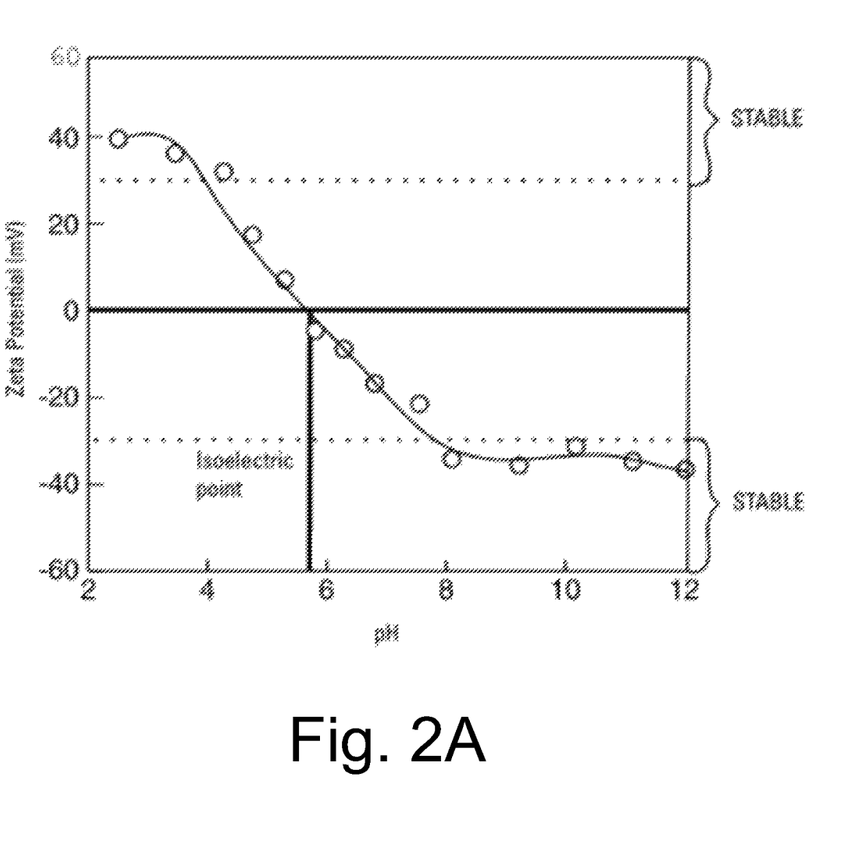
FIG. 2A-2C shows graphs of the zeta potential of certain particles to be used according to some embodiments of the present disclosure.
Figure 2B:
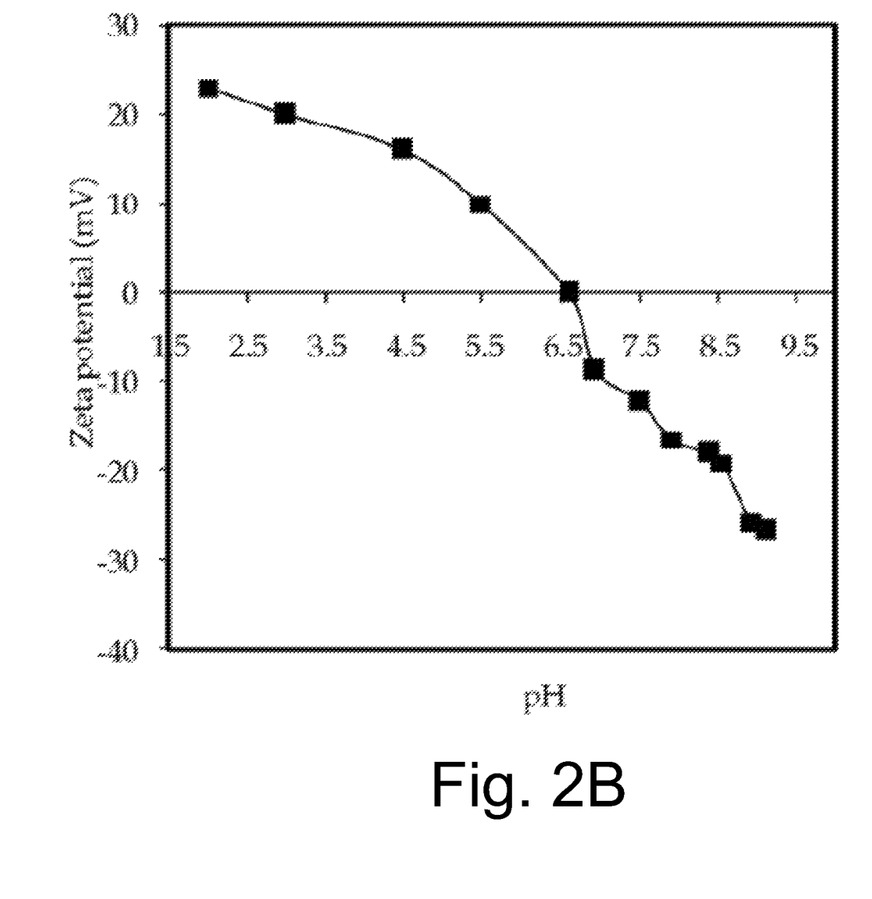
Figure 2C:
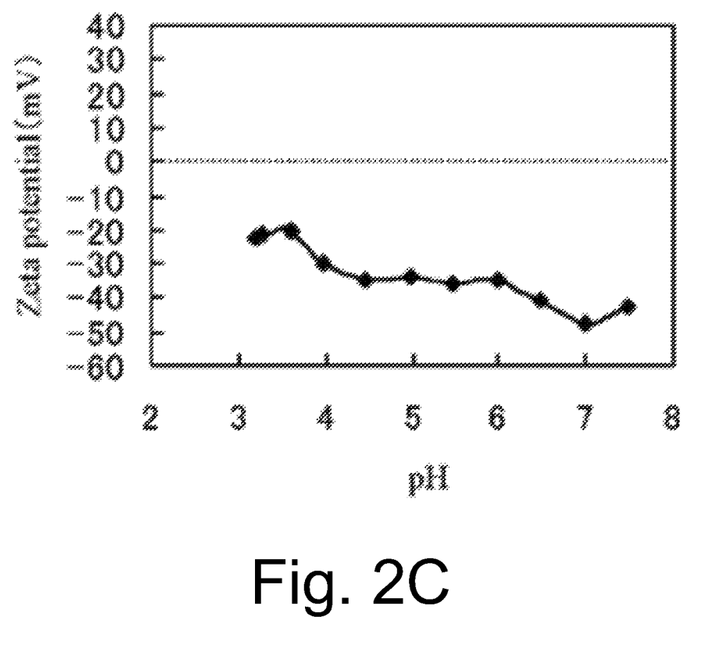

In some embodiments, the nanoparticle material can have a zeta potential in the fluid medium. FIGS. 2A-2C show zeta potentials of exemplary nanoparticles in a fluid medium, particularly the zeta potentials of silver, silicon, and copper, respectively. As shown, the zeta potential of a given nanoparticle may change with the pH of the fluid medium. As such, the zeta potential of the nanoparticle material can be controlled to any desired value by controlling the pH of the fluid medium. For example, the pH of the fluid medium can be configured to give the nanoparticle material a positive zeta potential when using an anionic surfactant. As would be appreciated by one of ordinary skill in the art, the opposite charges of the nanoparticle material and the surfactant would provide for a charge attraction of the two materials.

Embodiments of the present disclosure can provide a surfactant in the fluid medium. A variety of surfactants may alternatively be included in the present invention as a dispersant to facilitate uniform dispersion of nanoparticles in a desired fluid medium, and to enhance stabilization of such a dispersion as well. The surfactants used in the present invention can contain a lipophilic nonpolar hydrocarbon group and a polar functional hydrophilic group. The polar functional group may be a carboxylate, ester, amine, amide, imide, hydroxyl, ether, nitrile, phosphate, sulfate, or sulfonate. The surfactants that are useful in the present invention may be used alone or in combination. Accordingly, any combination of surfactants may include anionic, cationic, nonionic, zwitterionic, amphoteric and ampholytic surfactants, so long as there is a net positive charge in the head regions of the population of surfactant molecules.

Accordingly, the surfactants for use in the present invention may be anionic, including, but not limited to, sulfonates such as alkyl sulfonates, alkylbenzene sulfonates, alpha olefin sulfonates, paraffin sulfonates, and alkyl ester sulfonates; sulfates such as alkyl sulfates, alkyl alkoxy sulfates, and alkyl alkoxylated sulfates; phosphates such as monoalkyl phosphates and dialkyl phosphates; phosphonates; carboxylates such as fatty acids, alkyl alkoxy carboxylates, sarcosinates, isethionates, and taurates. Specific examples of carboxylates are sodium cocoyl isethionate, sodium methyl oleoyl taurate, sodium laureth carboxylate, sodium trideceth carboxylate, sodium lauryl sarcosinate, lauroyl sarcosine, and cocoyl sarcosinate. Specific examples of sulfates include sodium dodecyl sulfate (SDS), sodium lauryl sulfate, sodium laureth sulfate, sodium trideceth sulfate, sodium tridecyl sulfate, sodium cocyl sulfate, and lauric monoglyceride sodium sulfate.

Suitable sulfonate surfactants include, but are not limited to, alkyl sulfonates, aryl sulfonates, monoalkyl and dialkyl sulfosuccinates, and monoalkyl and dialkyl sulfosuccinamates. Each alkyl group independently contains about two to twenty carbons and can also be ethoxylated with up to about 8 units, preferably up to about 6 units, on average, e.g., 2, 3, or 4 units, of ethylene oxide, per each alkyl group. Illustrative examples of alky and aryl sulfonates are sodium tridecyl benzene sulfonate (STBS) and sodium dodecylbenzene sulfonate (SDBS).

Illustrative examples of sulfosuccinates include, but are not limited to, dimethicone copolyol sulfosuccinate, diamyl sulfosuccinate, dicapryl sulfosuccinate, dicyclohexyl sulfosuccinate, diheptyl sulfosuccinate, dihexyl sulfosuccinate, diisobutyl sulfosuccinate, dioctyl sulfosuccinate, C12-15 pareth sulfosuccinate, cetearyl sulfosuccinate, cocopolyglucose sulfosuccinate, cocoyl butyl gluceth-10 sulfosuccinate, deceth-5 sulfosuccinate, deceth-6 sulfosuccinate, dihydroxyethyl sulfosuccinylundecylenate, hydrogenated cottonseed glyceride sulfosuccinate, isodecyl sulfosuccinate, isostearyl sulfosuccinate, laneth-5 sulfosuccinate, laureth sulfosuccinate, laureth-12 sulfosuccinate, laureth-6 sulfosuccinate, laureth-9 sulfosuccinate, lauryl sulfosuccinate, nonoxynol-10 sulfosuccinate, oleth-3 sulfosuccinate, oleyl sulfosuccinate, PEG-10 laurylcitrate sulfosuccinate, sitosereth-14 sulfosuccinate, stearyl sulfosuccinate, tallow, tridecyl sulfosuccinate, ditridecyl sulfosuccinate, bisglycol ricinosulfosuccinate, di(1,3-di-methylbutyl)sulfosuccinate, and silicone copolyol sulfosuccinates.

Illustrative examples of sulfosuccinamates include, but are not limited to, lauramido-MEA sulfosuccinate, oleamido PEG-2 sulfosuccinate, cocamido MIPA-sulfosuccinate, cocamido PEG-3 sulfosuccinate, isostearamido MEA-sulfosuccinate, isostearamido MIPA-sulfosuccinate, lauramido MEA-sulfosuccinate, lauramido PEG-2 sulfosuccinate, lauramido PEG-5 sulfosuccinate, myristamido MEA-sulfosuccinate, oleamido MEA-sulfosuccinate, oleamido PIPA-sulfosuccinate, oleamido PEG-2 sulfosuccinate, palmitamido PEG-2 sulfosuccinate, palmitoleamido PEG-2 sulfosuccinate, PEG-4 cocamido MIPA-sulfosuccinate, ricinoleamido MEA-sulfosuccinate, stearamido MEA-sulfosuccinate, stearyl sulfosuccinamate, tallamido MEA-sulfosuccinate, tallow sulfosuccinamate, tallowamido MEA-sulfosuccinate, undecylenamido MEA-sulfosuccinate, undecylenamido PEG-2 sulfosuccinate, wheat germamido MEA-sulfosuccinate, and wheat germamido PEG-2 sulfosuccinate.

For an anionic surfactant, the counter ion is typically sodium but may alternatively be potassium, lithium, calcium, magnesium, ammonium, amines (primary, secondary, tertiary or quandary) or other organic bases. Exemplary amines include isopropylamine, ethanolamine, diethanolamine, and triethanolamine. Mixtures of the above cations may also be used.

In some embodiments, the surfactants for use in the present invention may also be cationic, so long as at least one surfactant bearing a net positive charge is also included. Such cationic surfactants include, but are not limited to, primarily organic amines, primary, secondary, tertiary or quaternary. For a cationic surfactant, the counter ion can be chloride, bromide, methosulfate, ethosulfate, lactate, saccharinate, acetate and phosphate. Examples of cationic amines include polyethoxylated oleyl/stearyl amine, ethoxylated tallow amine, cocoalkylamine, oleylamine, and tallow alkyl amine.

Examples of quaternary amines with a single long alkyl group are cetyl trimethyl ammonium bromide (CETAB), dodecyltrimethylammonium bromide, myristyl trimethyl ammonium bromide, stearyl dimethyl benzyl ammonium chloride, oleyl dimethyl benzyl ammonium chloride, lauryl trimethyl ammonium methosulfate (also known as cocotrimonium methosulfate), cetyl-dimethyl hydroxyethyl ammonium dihydrogen phosphate, bassuamidopropylkonium chloride, cocotrimonium chloride, distearyldimonium chloride, wheat germ-amidopropalkonium chloride, stearyl octyidimonium methosulfate, isostearaminopropal-konium chloride, dihydroxypropyl PEG-5 linoleammonium chloride, PEG-2 stearmonium chloride, behentrimonium chloride, dicetyl dimonium chloride, tallow trimonium chloride and behenamidopropyl ethyl dimonium ethosulfate.

Examples of quaternary amines with two long alkyl groups are distearyldimonium chloride, dicetyl dimonium chloride, stearyl octyldimonium methosulfate, dihydrogenated palmoylethyl hydroxyethylmonium methosulfate, dipalmitoylethyl hydroxyethylmonium methosulfate, dioleoylethyl hydroxyethylmonium methosulfate, and hydroxypropyl bisstearyldimonium chloride.

Quaternary ammonium compounds of imidazoline derivatives include, for example, isostearyl benzylimidonium chloride, cocoyl benzyl hydroxyethyl imidazolinium chloride, cocoyl hydroxy ethylimidazolinium PG-chloride phosphate, and stearyl hydroxyethylimidonium chloride. Other heterocyclic quaternary ammonium compounds, such as dodecylpyridinium chloride, can also be used.

The surfactants for use in the present invention may be nonionic, including, but not limited to, polyalkylene oxide carboxylic acid esters, fatty acid esters, fatty alcohols, ethoxylated fatty alcohols, poloxamers, alkanolamides, alkoxylated alkanolamides, polyethylene glycol monoalkyl ether, and alkyl polysaccharides. Polyalkylene oxide carboxylic acid esters have one or two carboxylic ester moieties each with about 8 to 20 carbons and a polyalkylene oxide moiety containing about 5 to 200 alkylene oxide units. A ethoxylated fatty alcohol contains an ethylene oxide moiety containing about 5 to 150 ethylene oxide units and a fatty alcohol moiety with about 6 to about 30 carbons. The fatty alcohol moiety can be cyclic, straight, or branched, and saturated or unsaturated. Some examples of ethoxylated fatty alcohols include ethylene glycol ethers of oleth alcohol, steareth alcohol, lauryl alcohol and isocetyl alcohol. Poloxamers are ethylene oxide and propylene oxide block copolymers, having from about 15 to about 100 moles of ethylene oxide. Alkyl polysaccharide ("APS") surfactants (e.g. alkyl polyglycosides) contain a hydrophobic group with about 6 to about 30 carbons and a polysaccharide (e.g., polyglycoside) as the hydrophilic group.

Specific examples of suitable nonionic surfactants include alkanolamides such as cocamide diethanolamide ("DEA"), cocamide monoethanolamide ("MEA"), cocamide monoisopropanolamide ("MIPA"), PEG-5 cocamide MEA, lauramide DEA, and lauramide MEA; alkyl amine oxides such as lauramine oxide, cocamine oxide, cocamidopropylamine oxide, and lauramidopropylamine oxide; sorbitan laurate, sorbitan distearate, fatty acids or fatty acid esters such as lauric acid, isostearic acid, and PEG-150 distearate; fatty alcohols or ethoxylated fatty alcohols such as lauryl alcohol, alkylpolyglucosides such as decyl glucoside, lauryl glucoside, and coco glucoside.

The surfactants for use in the present invention may be zwitterionic, meaning the same molecule has both a formal positive and negative charge. The positive charge group can be quaternary ammonium, phosphonium, or sulfonium, whereas the negative charge group can be carboxylate, sulfonate, sulfate, phosphate or phosphonate. Similar to other classes of surfactants, the hydrophobic moiety may contain one or more long, straight, cyclic, or branched, aliphatic chains of about 8 to 18 carbon atoms. Specific examples of zwitterionic surfactants include alkyl betaines such as cocodimethyl carboxymethyl betaine, lauryl dimethyl carboxymethyl betaine, lauryl dimethyl alpha-carboxyethyl betaine, cetyl dimethyl carboxymethyl betaine, lauryl bis-(2-hydroxyethyl)carboxy methyl betaine, stearyl bis-(2-hydroxypropyl)carboxymethyl betaine, oleyl dimethyl gamma-carboxypropyl betaine, and lauryl bis-(2-hydroxypropyl)alphacarboxy-ethyl betaine, amidopropyl betaines; and alkyl sultaines such as cocodimethyl sulfopropyl betaine, stearyidimethyl sulfopropyl betaine, lauryl dimethyl sulfoethyl betaine, lauryl bis-(2-hydroxyethyl)sulfopropyl betaine, and alkylamidopropylhydroxy sultaines.

The surfactants for use in the present invention may be amphoteric. Examples of suitable amphoteric surfactants include ammonium or substituted ammonium salts of alkyl amphocarboxy glycinates and alkyl amphocarboxypropionates, alkyl amphodipropionates, alkyl amphodiacetates, alkyl amphoglycinates, and alkyl amphopropionates, as well as alkyl iminopropionates, alkyl iminodipropionates, and alkyl amphopropylsulfonates. Specific examples are cocoamphoacetate, cocoamphopropionate, cocoamphodiacetate, lauroamphoacetate, lauroamphodiacetate, lauroamphodipropionate, lauroamphodiacetate, cocoamphopropyl sulfonate, caproamphodiacetate, caproamphoacetate, caproamphodipropionate, and stearoamphoacetate.

The surfactants for use in the present invention may also be a polymer such as N-substituted polyisobutenyl succinimides and succinates, alkyl methacrylate vinyl pyrrolidinone copolymers, alkyl methacrylate-dialkylaminoethyl methacrylate copolymers, alkylmethacrylate polyethylene glycol methacrylate copolymers, and polystearamides.

Alternatively, the surfactant may be an oil-based dispersant, which includes alkylsuccinimide, succinate esters, high molecular weight amines, and Mannich base and phosphoric acid derivatives. Some specific examples are polyisobutenyl succinimide-polyethylenepolyamine, polyisobutenyl succinic ester, polyisobutenyl hydroxybenzyl-polyethylenepolyamine, and bis-hydroxypropyl phosphorate.

The surfactant used in the present invention may also be a combination of two or more selected from the group consisting of anionic, cationic, nonionic, zwitterionic, amphoteric, and ampholytic surfactants. Suitable examples of a combination of two or more surfactants of the same type include, but are not limited to, a mixture of two anionic surfactants, a mixture of three anionic surfactants, a mixture of four anionic surfactants, a mixture of two cationic surfactants, a mixture of three cationic surfactants, a mixture of four cationic surfactants, a mixture of two nonionic surfactants, a mixture of three nonionic surfactants, a mixture of four nonionic surfactants, a mixture of two zwitterionic surfactants, a mixture of three zwitterionic surfactants, a mixture of four zwitterionic surfactants, a mixture of two amphoteric surfactants, a mixture of three amphoteric surfactants, a mixture of four amphoteric surfactants, a mixture of two ampholytic surfactants, a mixture of three ampholytic surfactants, and a mixture of four ampholytic surfactants.

Suitable examples of a combination of two surfactants of different types include, but are not limited to, a mixture of one anionic and one cationic surfactant, a mixture of one anionic and one nonionic surfactant, a mixture of one anionic and one zwitterionic surfactant, a mixture of one anionic and one amphoteric surfactant, a mixture of one anionic and one ampholytic surfactant, a mixture of one cationic and one nonionic surfactant, a mixture of one cationic and one zwitterionic surfactant, a mixture of one cationic and one amphoteric surfactant, a mixture of one cationic and one ampholytic surfactant, a mixture of one nonionic and one zwitterionic surfactant, a mixture of one nonionic and one amphoteric surfactant, a mixture of one nonionic and one ampholytic surfactant, a mixture of one zwitterionic and one amphoteric surfactant, a mixture of one zwitterionic and one ampholytic surfactant, and a mixture of one amphoteric and one ampholytic surfactant. A combination of two or more surfactants of the same type, e.g., a mixture of two anionic surfactants, is also included in the present invention.

The solid materials of the present invention may also contain one or more other chemicals to provide other desired chemical and physical properties and characteristics, depending on whether they are hydrophobic or hydrophilic. In addition to the chemicals discussed separately below for hydrophilic and hydrophobic fluid mediums, many other known types of additives such as dyes and air release agents, can also be included in finished compositions produced and/or used in the practice of the present invention. In general, the additive components are employed in the disclosed solid materials in minor amounts sufficient to enhance the performance characteristics and properties of the material. The amounts will thus vary in accordance with such factors as the viscosity characteristics of the fluid medium, the viscosity characteristics desired in the finished solid, the service conditions for which the solid is intended, and the performance characteristics desired in the solid materials.

Suitable additional chemical additives include, but are not limited to, buffering agents, corrosion inhibitors, defoamers, and scale inhibitors.

The buffering agents may be selected from any known or commonly used buffering agents. It will be appreciated by those skilled in the art that selected buffering agents can exhibit both anti-corrosion and buffering properties. In certain formulations, for example, benzoates, borates, and phosphates can provide both buffering and anti-corrosion advantages. In addition, a base can be used to adjust the pH value of a fluid medium. Illustrative examples of bases for use with this invention include commonly known and used bases, for example, inorganic bases such as KOH, NaOH, $NaHCO_3$, $K_2CO_3$, and $Na_2CO_3$. Therefore, the buffering system and base can be adapted to provide a nanofluid composition with a pH level between 7.5 and about 11.

The corrosion inhibitors may be either an organic additive or an inorganic additive. Suitable organic anti-corrosive additives include short aliphatic dicarboxylic acids such as maleic acid, succinic acid, and adipic acid; triazoles such as benzotriazole and tolytriazole; thiazoles suchs as mercaptobenzothiazole; thiadiazoles such as 2-mercapto-5-hydrocarbylthio-1,3,4-thiadiazoles, 2-mercapto-5-hydrocarbyldithio-1,3,4-thiadiazoles, 2,5-bis(hydrocarbylthio)-1,3,4-thiadiazoles, and 2,5-(bis)hydrocarbyldithio)-1,3,4-thiadiazoles; sulfonates; and imidazolines. Suitable inorganic additives include borates, phosphates, silicates, nitrates, nitrites, and molybdates.

Suitable defoamers include components such as silicon defoamers, alcohols such as polyethoxylated glycol, polypropoxylated glycol or acetylenic glycols.

Suitable scale inhibitors include components such as phosphate esters, phosphino carboxylate, polyacrylates, polymethacylate, styrene-maleic anhydride, sulfonates, maleic anhydride co-polymer, and acrylate-sulfonate co-polymer.

Embodiments of the present disclosure can provide a fluid medium. Suitable examples of a fluid medium can include, but are not limited to, nonpolar solvents, polar aprotic solvents, polar protic solvents, water-miscible solvents, or a combination thereof. There are many examples of appropriate solvents known to one of ordinary skill in the art, but suitable examples can include, but are not limited to, acetaldehyde, acetic acid, acetone, acetonitrile, butanediol, butoxyethanol, butyric acid, diethanolamine, diethylenetriamine, dimethyl acetamide (DMAc), dimethylformamide (DMF), dimethoxy ethane, dimethyl sulfoxide (DMSO), dioxane, ethanol, ethylamine, ethylene glycol, formic acid, furfuryl alcohol, glycerol, methanol, methyl diethanolamine, methyl isocyanide, N-methyl-2-pyrrolidone (NMP), propanol, propanediol, propanoic acid, propylene glycol, pyridine, tetrahydrofuran (THF), triethylene glycol, ethylene glycol, water, dimethyl hydrazine, hydrazine, hydrofluoric acid, hydrogen peroxide, nitric acid, sulfuric acid, pentane, cyclopentane, hexane, cyclohexane, benzene, toluene, chloroform, diethyl ether, dichloromethane, or a combination thereof.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 3:
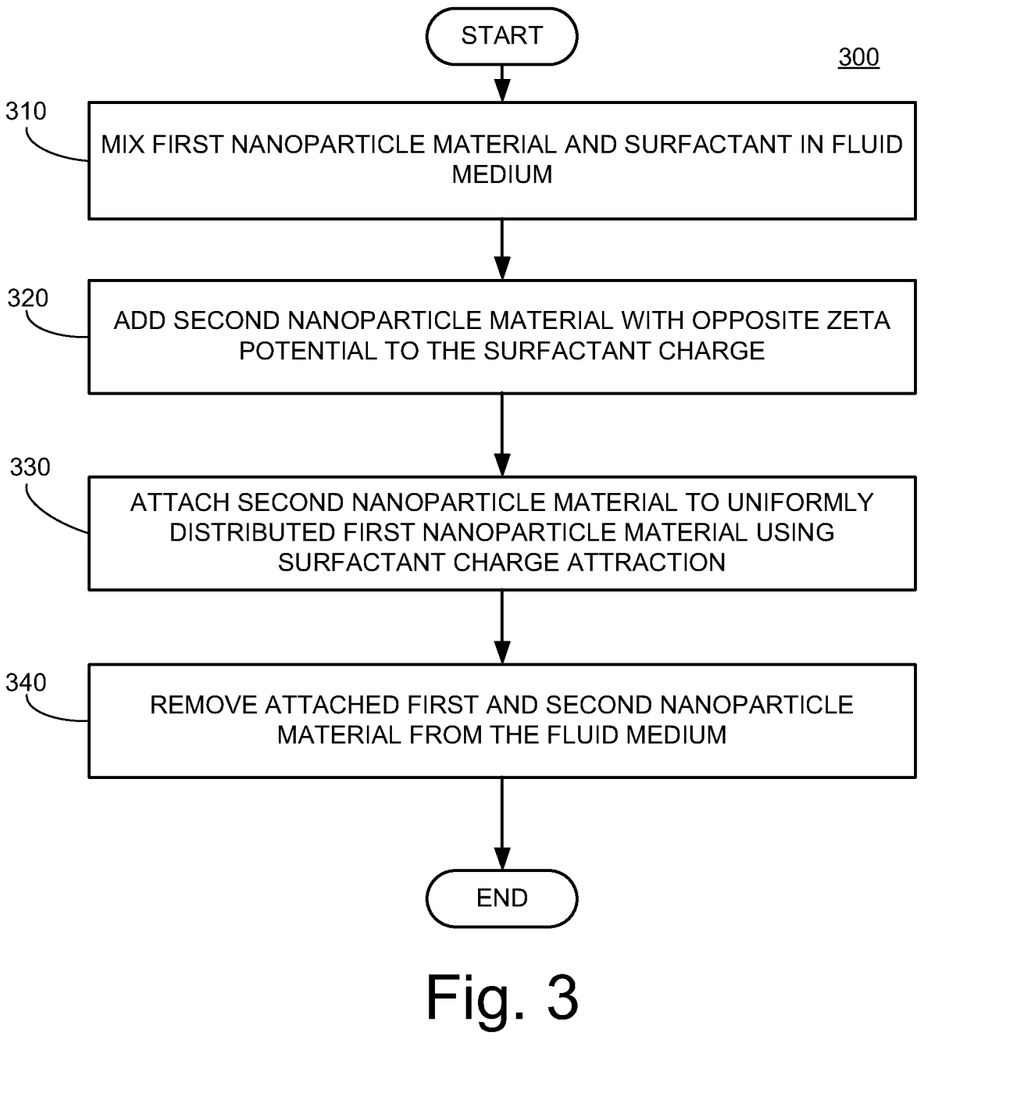
FIG. 3 is a flowchart of an exemplary method for making a solid material.
Figure 4:
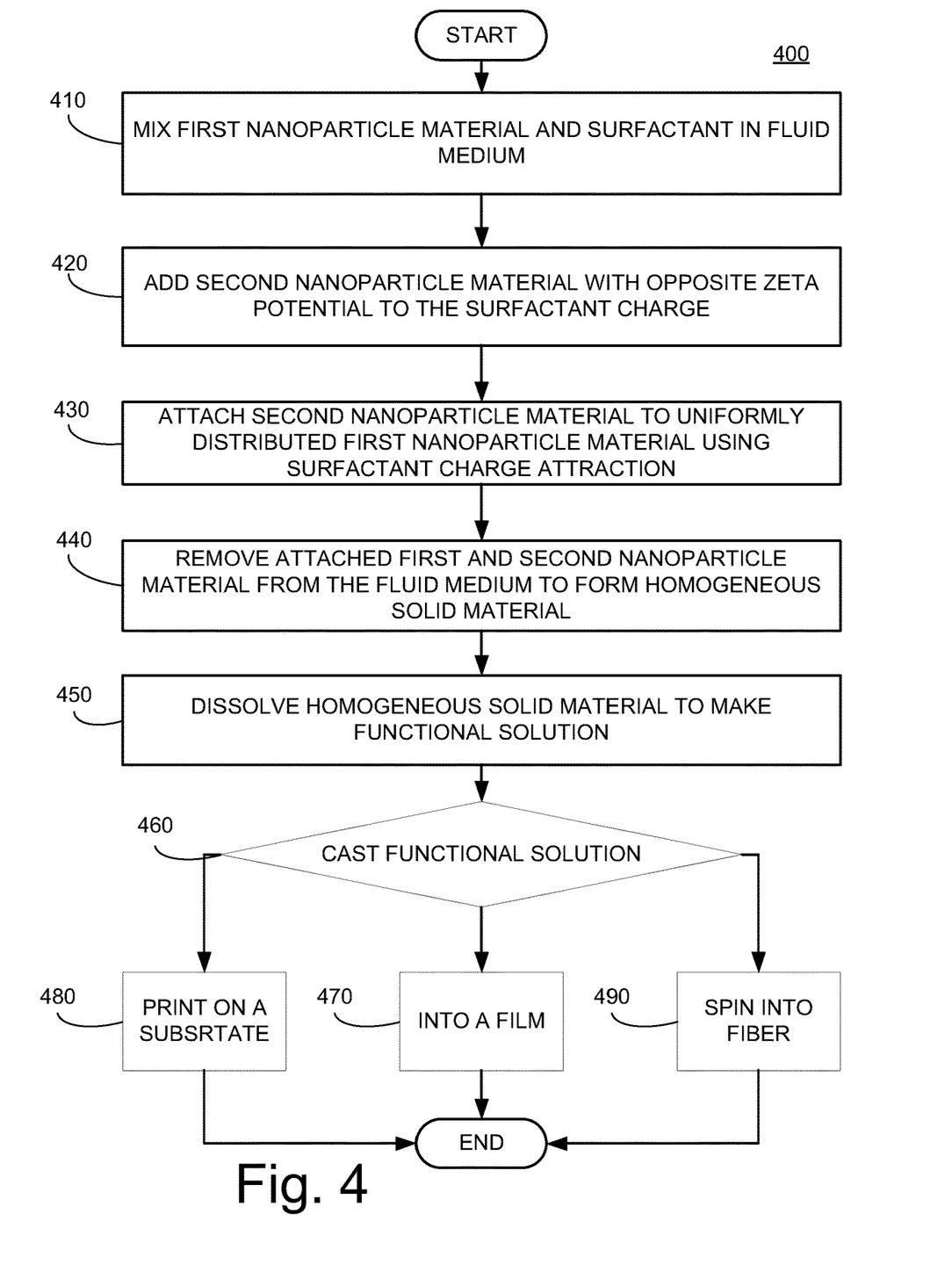
FIG. 4 is a flowchart of an exemplary method for making a solid material.

FIGS. 3-4 illustrate exemplary embodiments of the presently disclosed method of making a homogeneously distributed solvent.

In FIG. 3, a method for making a homogeneous solid material is disclosed. In block 310, at least a first nanoparticle material and a surfactant can be mixed in a fluid medium. In some embodiments, the fluid medium can be mixed using ultrasonication. Ultrasonication can be the least destructive to the structures of the nanoparticle materials. Ultrasonication can be done either in the bath-type ultrasonicator, or by the tip-type ultrasonicator. Typically, tip-type ultrasonication is for applications which require higher energy output. Ultrasonication at an intermediate intensity for up to 60 minutes, and usually in a range of from 10 to 30 minutes can be used to achieve better homogeneity. Additionally, the mixture can be ultrasonicated intermittently to avoid overheating. A variety of physical mixing methods are suitable for use in the present invention, including a conventional mortar and pestle mixing, high shear mixing, such as with a high-speed mixer, homogenizers, microfluidizers, high impact mixing, Morehouse mills, Buxton knife mills, Gaulin homogenizers, colloid mills, rotating knife-edge mills, rotor-stator mills, and three-roll mills, and ultrasonication methods. It is understood that, in some embodiments, the solution can comprise other species, such as inhibitors, catalysts, nonsolvents, and the like. In some embodiments, the surfactant can comprise a surface charge. The surface charge of the surfactant can facilitate the surfactant to interact with the first nanoparticle material to uniformly distribute the first nanoparticle material in the fluid medium.

In block 320, a second nanoparticle material having an opposite zeta potential to the surface charge of the surfactant can be added to the fluid medium. The second nanoparticle can be mixed into the fluid medium using a method of mixing as outlined above in block 310.

Figure 5:
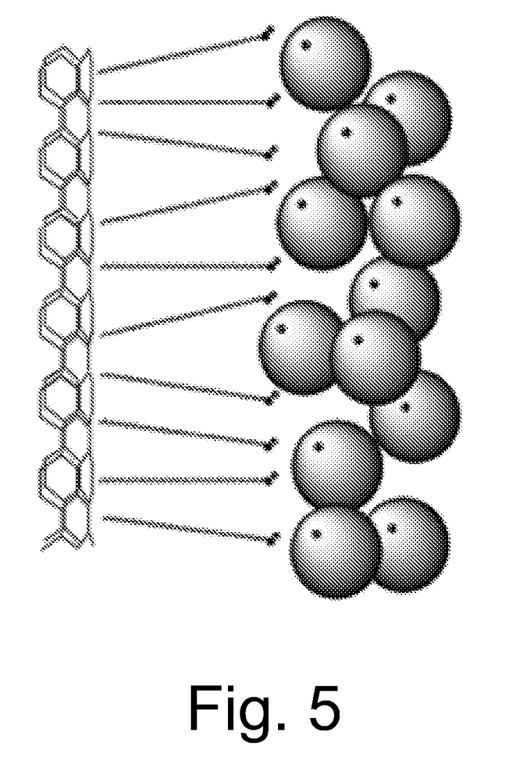
FIG. 5 shows a rendering of a solid material according to some embodiments of the present disclosure.

In block 330, the surface charge of the surfactant can facilitate the surfactant to attract the second nanoparticle material using the principle of opposite charges. With the surfactant attached to the first nanoparticle material and uniformly distributed in the system, the charge attraction of the second nanoparticle material can draw the material to the uniform distribution as well to attach to the surfactant/first nanoparticle combination. An exemplary embodiment of an attachment of a first and a second nanoparticle is illustrated in FIG. 5.

In block 340, the attached combination of the first and second nanoparticle materials can be removed from the fluid medium. In some embodiments, the removal can comprise vacuum filtering. Suitable examples of a filter can include a screen, a mesh, a sieve, and the like. Other methods of removing a solid from a fluid are considered, such as reverse osmosis, bag filters, paper filters, and the like.

In FIG. 4, a method for making a homogeneous solid material is disclosed herein. In block 410, at least a first nanoparticle material and a surfactant can be mixed in a fluid medium. In some embodiments, the fluid medium can be mixed using ultrasonication. Ultrasonication can be the least destructive to the structures of the nanoparticle materials. Ultrasonication can be done either in the bath-type ultrasonicator, or by the tip-type ultrasonicator. Typically, tip-type ultrasonication is for applications which require higher energy output. Ultrasonication at an intermediate intensity for up to 60 minutes, and usually in a range of from 10 to 30 minutes can be used to achieve better homogeneity. Additionally, the mixture can be ultrasonicated intermittently to avoid overheating. A variety of physical mixing methods are suitable for use in the present invention, including a conventional mortar and pestle mixing, high shear mixing, such as with a high-speed mixer, homogenizers, microfluidizers, high impact mixing, Morehouse mills, Buxton knife mills, Gaulin homogenizers, colloid mills, rotating knife-edge mills, rotor-stator mills, and three-roll mills, and ultrasonication methods. It is understood that, in some embodiments, the solution can comprise other species, such as inhibitors, catalysts, nonsolvents, and the like. In some embodiments, the surfactant can comprise a surface charge. The surface charge of the surfactant can facilitate the surfactant to interact with the first nanoparticle material to uniformly distribute the first nanoparticle material in the fluid medium.

In block 420, a second nanoparticle material having an opposite zeta potential to the surface charge of the surfactant can be added to the fluid medium. The second nanoparticle can be mixed into the fluid medium using a method of mixing as outlined above in block 410.

In block 430, the surface charge of the surfactant can facilitate the surfactant to attract the second nanoparticle material using the principle of opposite charges. With the surfactant attached to the first nanoparticle material and uniformly distributed in the system, the charge attraction of the second nanoparticle material can draw the material to the uniform distribution as well to attach to the surfactant/first nanoparticle combination. An exemplary embodiment of an attachment of a first and a second nanoparticle is illustrated in FIG. 5.

In block 440, the attached combination of the first and second nanoparticle materials can be removed from the fluid medium to obtain a homogeneous solid material. In some embodiments, the removal can comprise vacuum filtering. Suitable examples of a filter can include a screen, a mesh, a sieve, and the like. Other methods of removing a solid from a fluid are considered, such as reverse osmosis, bag filters, paper filters, and the like.

In block 450, the homogeneous solid material can be dissolved to create a functional solution. The solid material can be dissolved in a solution using a method of mixing outlined above. It is understood that, in some embodiments, the solution can comprise other species, such as inhibitors, catalysts, nonsolvents, and the like.

Figure 1:
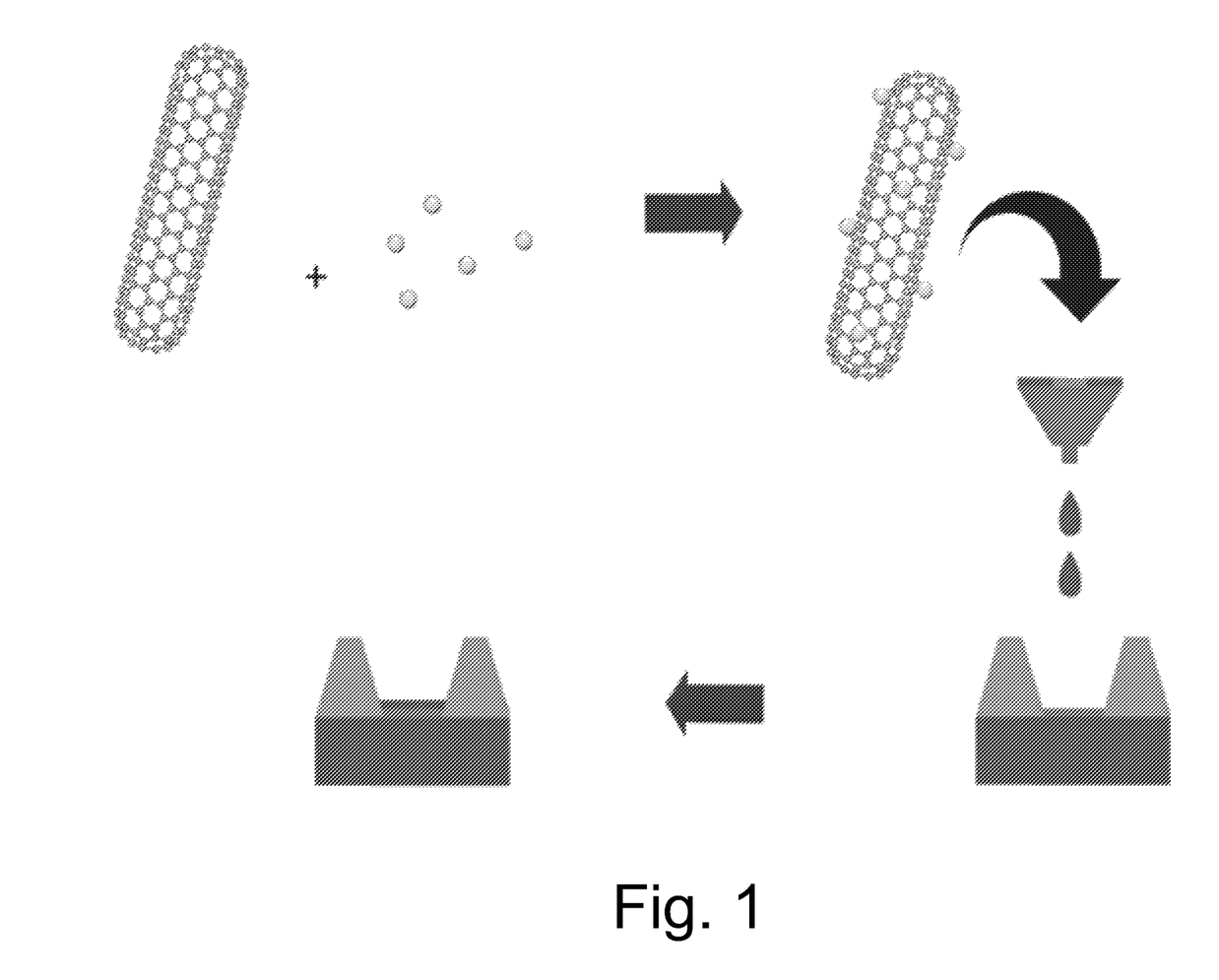
FIG. 1 shows a rendering of an exemplary embodiment of a method of making a solid material.

In block 460, the functional solution can be cast or formed into a number of functional solid applications. For example, in block 470, the functional solution can be cast into a film and cured using such methods as blade coating, dip coating, knife casting, or roller milling. Alternatively, as in block 480, the functional solution can be printed or built up on a substrate using known additive manufacturing techniques to create a 3-dimensional structure, additionally as shown in FIG. 1. In some embodiments, as in block 490, the functional solution can be spun into a fiber or hollow fiber using known techniques, such as the dry-jet wet-quench method. Additional embodiments or methods of forming the functional solution are considered, such as fused-deposition application, vapor-phase deposition, and other techniques known in the art suitable to distribute the functional solution.

Reference will now be made in detail to exemplary embodiments of the disclosed technology, examples of which are illustrated in the accompanying drawings and disclosed herein.

EXAMPLES

The following examples are provided by way of illustration but not by way of limitation.

Example 1

Thermal Transfer Fluid

SWNT-CNI and SWNT-RIC were produced using a chemical vapor deposition process ("VCD"), whereas SWNT-CAR was produced via an arc discharge method.

Several grades of carbon nanotubes are available from each company. For instance, CNI supplies "D" grade, HiPCO purified, and fluorinated carbon nanotubes. The "D" grade carbon nanotubes contain roughly 35% ash content along with some metal catalysts impurities. HiPCO purified and fluorinated carbon nanotubes contain less than 10% ash. Fluorinated carbon nanotubes have their end cap functionalized with fluorine. The carbon nanotubes from Carbolex (SWNT-CAR) are AP grade without purification. The carbon nanotubes from Rice University have been functionalized with sulfonated aryl groups, allowing them to be more easily dispersed in polar solvents such as water and methanol.

Metal oxide nanoparticles used in some embodiments can be magnesium oxide (MgO) with an average diameter of 12 nm, aluminum oxide ($Al_2O_3$) with an average diameter of 40 nm, copper oxide (CuO) with an average diameter of 33 nm, and magnesium hydroxide ($Mg(OH)_2$) with an average diameter of 26.8 nm. These metal oxide nanoparticles were all obtained from Sigma Aldrich (St. Louis, Mo.).

In the following examples, thermal conductivity was measured using a Hot Disk™. Thermal Constant Analyzer (Uppsala, Sweden). The senor was a 2 mm nickel double spiral sensor covered by a thin kapton layer. After each measurement, the sample was allowed to sit for 15 min before the next measurement. Both particle size and zeta-potential were determined using NICOMP 380 ZLS by Particle Sizing Systems. Zeta potential was measured by using the electrophoretic light scattering method (ELS). Particle size is obtained by use of the multi-angle dynamic light scattering technique (DLS). Ultrasonication was performed using a Branson model 450 ultrasonicator with a half-inch disruptor horn. Transmission electron microscopy (TEM) was performed using the Hitachi H-7000FA Electron Microscope.

Three different surfactants were tested, SDBS, SDS, and CTAB. The two anionic surfactants, SDBS and SDS, work equivalently well in dispersing the carbon nanotubes in water, and water and ethylene glycol mixtures. However, the nanofluid that contains the cationic CTAB exhibits a poor stability.

When dispersed via ultrasonication for 90 seconds, the resulted anionic surfactant-containing nanofluid was stable for a few days. The SDS-containing nanofluid shows a thermal conductivity of 0.6565±0.007 W/mK, which is similar to that of the SDBS-containing nanofluid as described herein above. For anionic surfactants, the optimal ratio of surfactant vs. the carbon nanotubes for effective dispersion of carbon nanotubes was found to be about 10:1 (surfactant:carbon nanotubes, w/w).

In addition to MgO, two additional non-carbon nanoparticles were used in this study, CuO and $Al_2O_3$. CuO has a pH point of zero charge ("pHpzc") of 9.5, whereas $Al_2O_3$ has a pHpzc of 9.2. The pH effect on the thermal conductivities of the $Al_2O_3$-containing nanofluids suggests that, for some embodiments, the pH should be no greater than the pHpzc value of the non-carbon nanoparticle.

For comparison, a series of hydrophilic nanofluids that contain functionalized SWNT-RIC were also prepared. Due to the polar sulfonated aryl group attached to the sidewall of the SWNT, SWNT-RIC was readily dispersed into water, a 50-50 water and ethylene glycol mixture, and ethylene glycol. The dispersions were stable over long time periods. Dispersions of the SWNT-RIC were obtained through stirring with a glass rod, or via a few second ultrasonication (10 seconds or less).

The thermal conductivity of a nanofluid that comprises 0.5% by weight of SWNT-RIC in water was determined to be 0.6397±0.0006 W/mK. The thermal conductivity of a nanofluid that comprises 0.1% by weight of SWNT-RIC in water was determined to be 0.6389±0.0005 W/mK.

The thermal conductivity of a nanofluid that comprises 0.5% by weight of SWNT-RIC in a solution that contains 50% by volume of water and 50% by volume of ethylene glycol was determined to be 0.4441±0.0190 W/mK. The thermal conductivity of a nanofluid that comprises 0.1% by weight of SWNT-RIC in a solution that contains 50% by volume of water and 50% by volume of ethylene glycol was determined to be 0.4483±0.0228 W/mK. There was a slight increase in thermal conductivity from 0.415 W/mK to about 0.444 W/mK. The solution was stable at a pH of 10, but when the pH was changed to 7, the solution of SWNT-RIC started to agglomerate, and the dispersion worsened considerably, leading to decrease in thermal conductivity.

Example 2

Transparent Conductive Anodes

Carbon nanotubes are commercially available from a variety of sources. Single walled carbon nanotubes can be obtained from MER Corporation (Tucson, Arizona), and Carbon Nanotechnologies Incorporation ("CNI", Houston, Texas). Multi-walled carbon nanotubes can be obtained from MER Corporation (Tucson, Arizona). The most common techniques are arc discharge, laser ablation, chemical vapor deposition, and flame synthesis. In general, the chemical vapor deposition showed the ability to produce larger quantities of nanotubes at lower cost. This is usually done by reacting a carbon containing gas, such as acetylene, ethylene, ethanol, etc., with a metal catalyst particle, such as cobalt, nickel, or ion, at temperatures above 600° C.

Silver nanoparticles could be purchased from Sigma Aldrich. Another vendor is US Research Nanomaterials Inc., which sells different sized silver nanoparticles with excellent quality.

A Harrick plasma cleaner was used to treat Ag and nanotube particles and get a more hydrophilic surface.

Raman, X-ray diffraction (XRD), scanning electron microscope (SEM) and Transmission electron microscope (TEM) was used to characterize the above nanoparticles as received and after treatment, to compare particles' size, shape, purity, etc. The surface enhanced particles (hydrophilic) was used for the coming experiment.

Spherical Ag nanoparticles were homogeneously mixed with carbon nanotubes by the help of chemical surfactant.

Metal oxide nanoparticles and Si nanoparticles were mixed with each other with the help of appropriate chemical surfactants. A possible explanation for this is related to the aggregation of a metal oxide (Si) on the surface of nanotubes by electrostatic attraction to probably form aggregations along the nanotube.

Example 3

Advanced Conductive Material

The selection of Cu material represents a Cu conductive material with good ductility and electrical conductivity. The pure copper powder was used as the starting matrix materials. Copper powders with purity of 99.9% and particle size of 100 nm were purchased from US Research Nanomaterials Inc. Both single-walled CNTs (SWNTs) and multi-walled CNTs (MWNTs) were used and could be purchased from Cheap Tubes, Inc. The surfactant cetyltrimethylammonium bromide (CTAB) were purchased from Sigma-Aldrich and used as received.

The following procedure was used to mix Cu particles and CNTs homogeneously, then lead to homogeneous coating. Ultrasonication was performed with a Branson Model 450 Digital Sonifier with a ½EE disrupter horn. Initially, sufficient surfactant was first dispersed in deionized water of resistivity 18 Me-cm by using ultrasonication for 20 minutes until a clear solution was achieved. Then, SWNT(MWNT) was added to the solution and sonicated for an additional 20 minutes. Finally, Cu nanoparticles were added to the mixture and sonicated for 40 minutes. After ultrasonication, the solid particles will precipitate. This solution together with precipitated solid was filtered and dried inside a vacuum oven at 80° C. for 10 hours at a pressure of 15 inches of mercury.

Example 4

Formaldehyde/Hydrogen Sulfide Sensor 0.2 g of NaDDBS surfactant was dissolved in 100 g DI water with aid of ultrahigh tip sonicator for 30 min at 35 W. Afterwards, 0.02 g of y-$Fe_2O_3$ nanoparticles were added to the mixture and sonicated again for another 30 min. 0.02 g of carbon nanotubes/GO were added to the mixture and sonicated for two times in 15-minute intervals. The mixture was then filtered (suction filtration) and washed with a plenty of water to remove excess surfactant. Finally, the sample was dried overnight by putting it in a vacuum oven at 80° C.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. A method of homogeneously mixing solids comprising:
    mixing, in a fluid medium, a first nanoparticle material and a surfactant, wherein the first nanoparticle material comprises magnetic sensitive nanoparticles and has a first zeta potential;
    adding, to the mixed fluid medium, a second nanoparticle material comprising:
        a 1-dimensional material comprising nanostructures only having a dimension within the range between 1 and 100 nm; and
        a 2-dimensional material;
        wherein the second nanoparticle material has a second zeta potential of opposite polarity to the first zeta potential; and
        wherein at least a portion of the first and second nanoparticle materials form a homogeneous material in the fluid medium via the charge attraction of the first and second zeta potentials; and
    removing at least a portion of the homogeneous material from the fluid medium.

2. The method of claim 1 further comprising removing at least a portion of the surfactant from the homogeneous material.

3. The method of claim 1, wherein the surfactant is selected so the first nanoparticle material distributes uniformly in the fluid medium; and
    wherein a solid homogeneous material is formed upon removing at least a portion of the homogeneous material from the fluid medium.

4. The method of claim 2 further comprising:
    dissolving at least a portion of the homogeneous material into a functional solution; and
    casting the functional solution into a film.

5. The method of claim 1 further comprising:
    dissolving at least a portion of the homogeneous material into a functional solution; and
    casting, using additive manufacturing, the functional solution into a 3-dimensional structure.

6. The method of claim 1 further comprising:
    dissolving at least a portion of the homogeneous material into a functional solution; and
    spinning the functional solution into a fiber.

7. The method of claim 1 further comprising:
    dissolving at least a portion of the homogeneous material into a functional solution; and
    printing the functional solution onto a substrate.

8. The method of claim 1 further comprising:
    removing at least a portion of the surfactant from the homogeneous material; and
    forming a buffer solution in the fluid medium;
    wherein the 1-dimensional material and the 2-dimensional material have one or more material properties selected from the group consisting of electrical properties, thermal properties, mechanical properties, magnetic properties, and a combination thereof;
    wherein at least one of the material properties of the 1-dimensional material and the 2-dimensional material is different;
    wherein the surfactant is selected so the first nanoparticle material distributes uniformly in the fluid medium; and
    wherein a solid homogeneous material is formed upon removing at least a portion of the homogeneous material from the fluid medium.

9. The method of claim 1, wherein the 1-dimensional material and the 2-dimensional material are different allotropes of carbon; and
    wherein the magnetic sensitive nanoparticles are selected from the group consisting of elemental metals, metal oxides, metal alloys, and a combination thereof.

10. The method of claim 9, wherein the 1-dimensional material comprises single-walled carbon nanotubes; and
    wherein the 2-dimensional material comprises graphene.

\* \* \* \* \*